Oct. 5, 1965         E. G. WIELLAND         3,210,232
                      ORNAMENTAL DEVICE
Filed Dec. 3, 1962                          2 Sheets-Sheet 1

INVENTOR
Edna George Wielland

BY Stevens, Davis, Miller & Mosher
ATTORNEYS

Oct. 5, 1965    E. G. WIELLAND    3,210,232
ORNAMENTAL DEVICE
Filed Dec. 3, 1962    2 Sheets-Sheet 2

INVENTOR
Edna George Wielland

BY *Stevens, Davis, Miller & Mosher*
ATTORNEYS

_United States Patent Office_

3,210,232
Patented Oct. 5, 1965

3,210,232
ORNAMENTAL DEVICE
Edna George Wielland, 8906 Ventnor Ave.,
Margate City, N.J.
Filed Dec. 3, 1962, Ser. No. 241,857
5 Claims. (Cl. 161—24)

This invention relates to ornamental forms and more particularly to artificial trees suitable for use as Christmas decorations.

Ideally an artificial Christmas tree is easy to store, fire resistant and adaptable to differing schemes of decoration. While artificial trees of the prior art have achieved some of these objectives, they are characterized, in general, by a too literal copying of nature and thus they tend to limit one's initiative and originality in decoration.

An outstanding feature of the present invention is that it is essentially an impressionist interpretation of a natural form, affording a stage conducive to unlimited scope and versatility in decoration. On a more mundane plane the invention provides a safe and attractive ornament of such construction as to be easily assembled from available low cost materials.

It is also an object of the present invention to provide a rugged and sturdy artificial tree which has no cumbersome center post.

Other objects an advantages of this invention will be apparent upon consideration of the following detailed description of several embodiments thereof in conjunction with the annexed drawings wherein.

Figure 1:
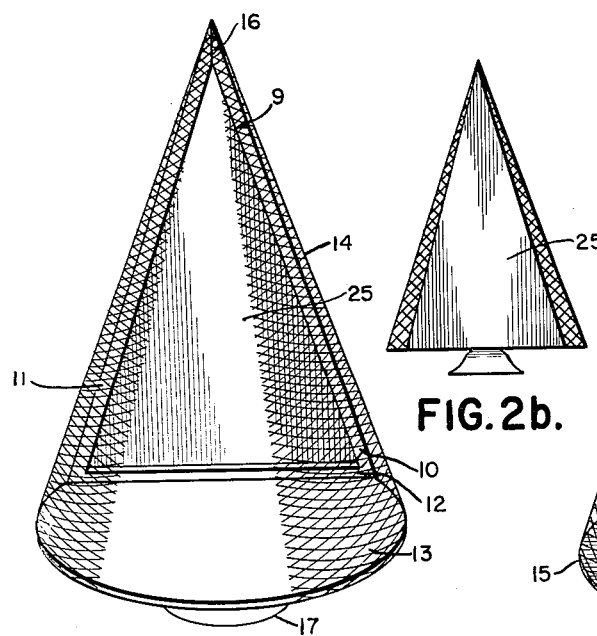
FIGURE 1 is a view in front elevation of a preferred form of the present invention.
Figures 2, 2B:
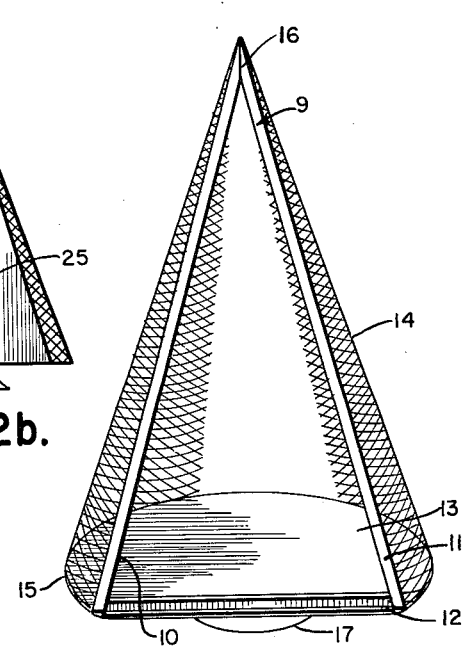
FIGURE 2 is a rear view of the tree of FIGURE 1 with the backing panel removed to show details of construction.
FIGURE 2b is a rear view of the tree of FIGURE 1 with the backing panel in place.

Referring now in greater detail to FIGURES 1 and 2, the tree consists of a triangular frame 9 connected through its base piece 12 to the straight edge of a semi-elliptical base board 13. The frame 9 which is composed of pieces 10, 11, and 12 in the form of an isosceles triangle extends at right angles to the plane of board 13. An open mesh wire net 14 is secured to the edge 15 of the base 13, to the apex 16 of frame 9 and to the edges of the pieces 10 and 11 to form a generally conical shape that resembles a tree. The board 13 is mounted upon a suitable stand 17 at its center and a triangular shaped backing panel 25 (FIGURE 3) completes the tree.

Figure 5:
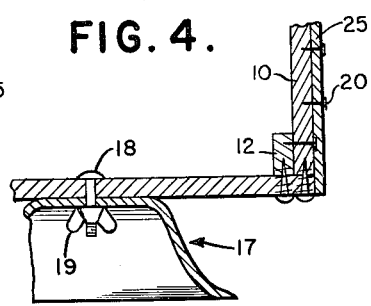
FIGURE 5 is a fragmentary sectional view showing the connection between a stand, a base member and frame members of the tree of FIGURE 1.
Figure 8:
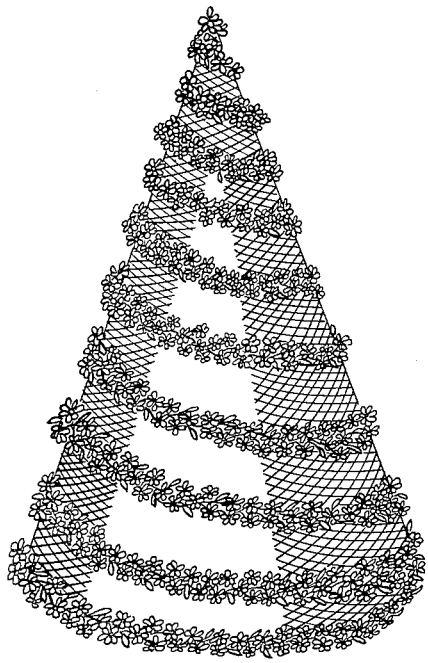
FIGURE 8 is a perspective view of the tree of FIGURE 1 as it looks after complete trimming with spiraled garlands of holly, ribbon, tinsel, or fruits, etc.

In a preferred embodiment of this invention 1" x 2" wooden boards were used to form the triangular frame 9, the vertical members 10 and 11 each being 8 feet high and the horizontal member 12 being 38" long. The base 13, a semi-elliptical piece of ¾" plywood 38" x 42", is nailed at right angles to the triangle along the bottom edge of the horizontal member 12. A piece of one-inch mesh chicken wire is nailed along the outside edge of the plywood base 13, extends upward and is nailed to the apex 16 of the triangle and along the edges of the 1" x 2" vertical member 10 and 11. The stand 17 (see FIGURE 5) is an inverted metal bowl about 12" in diameter secured with a bolt 18 and a wing nut 19 through its center and the center of the base 13. The entire tree was painted white and decorated with garlands consisting of artificial holly, two strands of lights, chains of small silver balls, and ribbon bows. The garlands were attached with pieces of string and arranged in spirals, wound at intervals of 10 inches down the length of the tree to form a beautifully decorated tree as shown in FIGURE 8.

Figure 4:
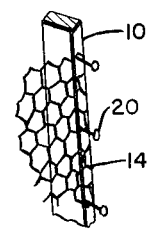
FIGURE 4 is a fragmentary view showing the connection between the wire mesh forming the tree surface and the frame.

FIGURE 4 illustrates the attachment of the wire mesh 14 to the vertical member 10 by means of bending the wire 14 around the member 10 and fastening it with staples or nails 20.

Figure 6:
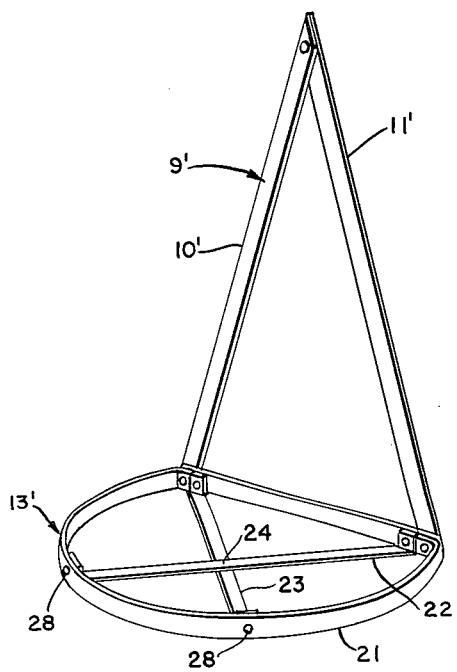
FIGURE 6 is a perspective view of a base with a framing member of metal construction.
Figure 7:
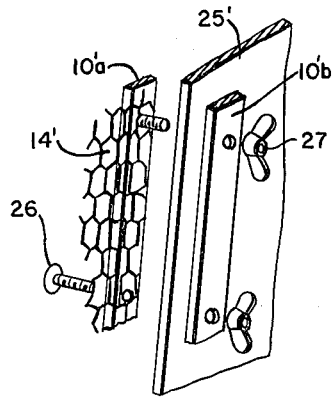
FIGURE 7 is a detailed view showing the method of attaching wire mesh to metal frame members.

It is to be understood that this invention contemplates the use of materials other than wood for frame 9 and base 13. The use of metal strips, especially aluminum, is illustrated in FIGURE 6. In FIGURE 6 like numbers are used for parts which correspond to those described in conjunction with FIGURES 1 to 5, except that a prime suffix is used. The vertical frame members 10' and 11' are double aluminum strips. FIGURE 7 shows these double aluminum strips 10'a and 10'b. The wire mesh 14', and the backing panel 25' are placed between strips 10'a and 10'b and bolt 26 held by wing nut 27 passes through aligning holes in the strips 10'a and 10'b and panel 25' to hold the entire assembly together.

It will be noted from the above-described arrangement that the base member 13 or 13' together with the frame 9 or 9' constitute a self-supporting structure, i.e., the frame is rigidly supported uprightly by the base. It will also be noted that the frames 9 and 9' are open frames so that access to the inner side of the wire mesh can be easily had by simply reaching between the frame members 10, 11 or 10', 11'.

Figure 3:
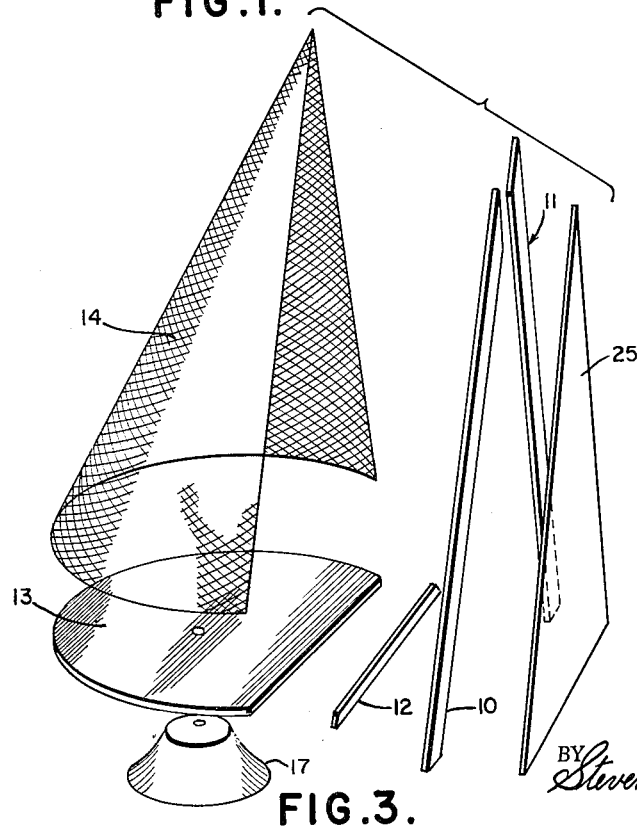
FIGURE 3 is an exploded view of the tree of FIGURE 1 in side elevation.

When the base 13' is constructed of metal as shown in FIGURE 6 the outer edge of the base is made of flexible band 21 which may be bent to give the base various shapes. The cross members 22 and 23 are held in place by wing nuts 28 which may easily be removed for storage purposes and when so removed the band 21 may be straightened out for more convenient storage, it being understood that wing nuts also are used to secure the band 21 to the base of the frame. Further, wing nuts are also used to secure the mesh to the band 21 similarily to the manner shown in FIGURE 7. A stand such as the stand 17 of FIGURE 3 is mounted at the intersection 24 of the cross members 22 and 23 in the manner previously described. The metal base may be covered by cardboard or decorative paper to conceal it.

Figure 9:
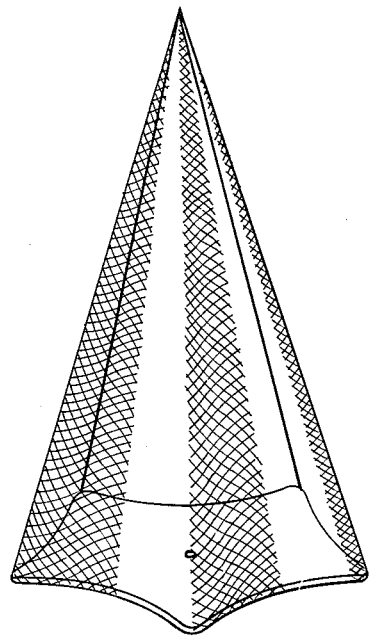
FIGURE 9 illustrates an alternative form of the tree utilizing a base of star-shaped cross section.

It is further contemplated to make this tree in various cross-sectional shapes such as full round, triangular, half star or full star as illustrated in FIGURE 9. In addition various lighting means may be incorporated into the tree such as small flood lights built into the base to illuminate the interior of the tree. The backing panel may be covered with various decorative materials such as the embossed foil often used in Christmas gift wrapping to give a variety of appearances as the tree is re-used from year to year.

It is of course to be understood that the disclosed structure is not necessarily limited to being used to simulate only a Christmas tree or only a tree. The shape of the device and the decorations applied thereto can be varied at will to serve various decorative purposes.

What is claimed is:

1. An ornament comprising a self-supporting simulated tree comprising a substantially flat base member, a rigid triangular frame secured at its base to said member and defining a single plane disposed at right angles to said base member, an open wire mesh secured to the periphery of said base member and also secured to the edges of said triangular frame so as to form a shape having as its base a cross section conforming to the periphery of said base member and tapering to the apex of said frame.

2. An artificial ornamental self-supporting device comprising a horizontal base portion, the periphery of said base portion comprising a generally convex edge having opposite ends, a rigid upright triangular frame comprising upwardly converging side pieces secured at their lower ends to said opposite ends of said convex edge with said frame lying in a vertical plane, an open wire mesh secured to said convex edge and to the side pieces of said frame whereby said wire mesh constitutes a conical surface between said frame and said convex edge with said base portion and frame constituting a self-supporting structure.

3. The device of claim 2, wherein said base portion comprises an open frame with said convex peripheral edge being constituted by a band of material, wherein said band is a flexible band and is detachably secured at its opposite ends to said side pieces, said band being adopted to assume a straight elongate form when detached from said side pieces.

4. The device of claim 3, wherein said side pieces each comprise double strips in facing contact with each other, said mesh being removably clamped between the faces of said strips and also being removably clamped to said flexible band.

5. The device of claim 3, wherein said side pieces converge and meet to form an apex of said triangular frame, said side pieces being detachably joined together at said apex and said mesh being detachably secured to said side pieces and to said flexible band.

References Cited by the Examiner
UNITED STATES PATENTS

| | | | |
|---|---|---|---|
| 1,764,540 | 6/30 | Vydra | 161—24 XR |
| 2,186,327 | 1/40 | Crosser | 161—22 XR |
| 2,382,746 | 8/45 | Price | 161—24 |
| 2,669,049 | 2/54 | Smith | 161—22 |
| 2,864,192 | 12/58 | Shoalts | 161—22 XR |

ALEXANDER WYMAN, *Primary Examiner.*

JACOB STEINBERG, *Examiner.*